United States Patent [19]
Cappelle et al.
[11] 3,916,358
[45] Oct. 28, 1975

[54] TURRET TUNERS, SPECIFICALLY MEANS FOR MOUNTING COIL STRIPS AND OSCILLATOR ADJUSTING SCREWS

[75] Inventors: Norman D. Cappelle, Arlington Heights; Walter Meyer, McHenry, both of Ill.

[73] Assignee: Oak Industries, Inc., Crystal Lake, Ill.

[22] Filed: Mar. 15, 1974

[21] Appl. No.: 451,489

[52] U.S. Cl. ...................... 334/51; 334/57; 403/334
[51] Int. Cl.² ............................................ H03J 5/06
[58] Field of Search ............... 334/50, 51, 57, 58, 2; 248/314; 403/334, 375, 284

[56] References Cited

UNITED STATES PATENTS

| | | | |
|---|---|---|---|
| 1,081,998 | 12/1913 | Whitcomb | 192/107 R |
| 1,138,012 | 5/1915 | Perkins | 403/33 X |
| 1,655,827 | 1/1928 | Stanley | 192/107 R |
| 1,734,598 | 5/1929 | Schramm | 192/107 R |
| 3,182,345 | 5/1965 | Smith | 403/375 |
| 3,249,902 | 5/1966 | Warthan et al. | 334/50 |
| 3,664,617 | 5/1972 | Fenwick | 248/314 |
| 3,697,904 | 10/1972 | Mohri et al. | 334/51 |

*Primary Examiner*—Alfred E. Smith
*Assistant Examiner*—Wm. H. Punter
*Attorney, Agent, or Firm*—Kinzer, Plyer, Dorn & McEachran

[57] ABSTRACT

A TV tuner includes a plurality of oscillator coil strips, each of which carries an adjustable oscillator screw. Means are provided on the support for the coil strips and the oscillator screws for tightly mounting the coil strips to the support and for preventing relative movement between portions of the support to avoid reset problems in the oscillator screws.

7 Claims, 7 Drawing Figures

TURRET TUNERS, SPECIFICALLY MEANS FOR MOUNTING COIL STRIPS AND OSCILLATOR ADJUSTING SCREWS

SUMMARY OF THE INVENTION

The present invention relates to improvements in TV tuners and in particular to improvements preventing undesirable movement of the oscillator adjusting screw.

A primary purpose of the invention is a TV tuner in which the coil strips mounting the oscillator coils are supported with an interference fit to avoid unwanted movement of the strip and hence undesirable movement of the oscillator adjusting screw.

Another purpose is a TV tuner of the type described including means for preventing relative movement between support members, thereby insuring against unwanted movement of the oscillator adjusting screw.

Another purpose is a simply constructed reliably operable TV tuner including means for avoiding electrical reset problems.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figures 1, 2, 3, 4, 5, 6, 7:
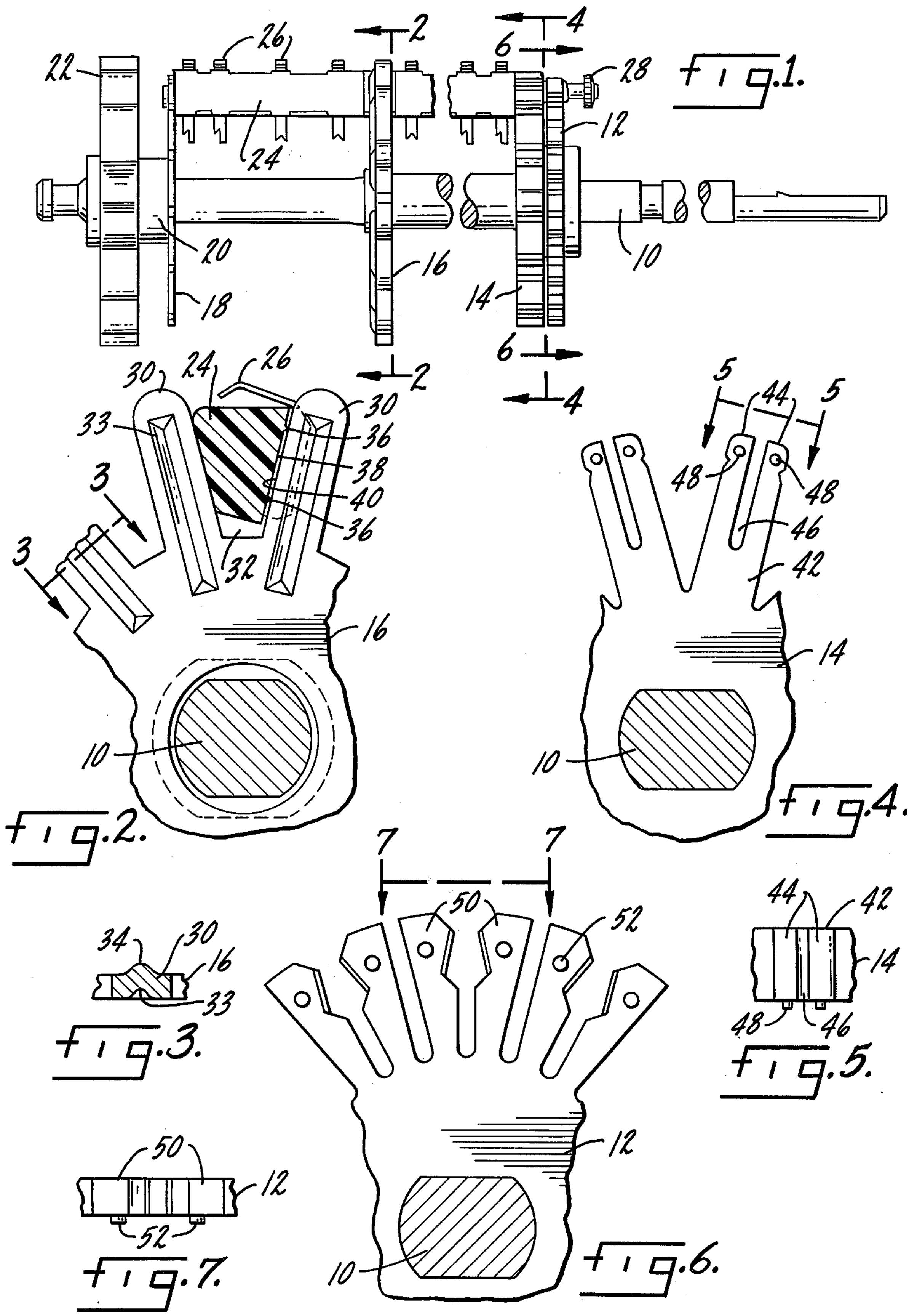
FIG. 1 is a partial side view of a TV tuner.
FIG. 2 is a partial section along plane 2—2 of FIG. 1.
FIG. 3 is a section along plane 3—3 of FIG. 2.
FIG. 4 is a partial section along plane 4—4 of FIG. 1.
FIG. 5 is a view along plane 5—5 of FIG. 4.
FIG. 6 is a partial section along plane 6—6 of FIG. 1.
FIG. 7 is a view along plane 7—7 of FIG. 6.

The present invention relates to VHF television tuners, but the principles disclosed herein may have equal application with UHF tuners. Basically, the invention concerns means for insuring that the oscillator adjustment screw will not have undesirable and unwanted movement once it has been placed in an appropriate adjusted postition.

In FIG. 1, the television tuner selector shaft is indicated at 10 and may coaxially mount an oscillator screw retaining disc 12 and a strip retaining disc 14. Spaced from the disc 14 and generally intermediately positioned on the shaft 10 is a center shield 16. Positioned at the opposite end of the channel selector shaft 10 is a strip retaining rotor spring 18 having an integral washer 20 separating it from a detent wheel 22. It should be understood that the housing and the remaining electrical portions of the tuner have been omitted for purposes of clarity.

A plurality of oscillator coil forms or coil strips are peripherally mounted by the disc 14, center shield 16 and spring 18. One of such coil strips is indicated at 24 and is shown to include a plurality of spaced terminals 26. There will be individual coils wound between each of the terminals 26. This particular structure is known in the art and will not be described in detail. The oscillator adjusting screws 28 will extend into the coil strips 24 and will be rotated by conventional fine tuning means, not shown, in order to fine tune each of the channels represented by the coil strips.

FIG. 2 illustrates the manner in which the center shield 16 supports the coil strips 24. The center shield 16 may have a plurality of radially outwardly extending fingers 30, with each pair of adjacent fingers defining a gap 32 which holds a coil strip 24. Each of the fingers 30 may be deformed, as illustrated particularly in FIG. 3, with a radially extending groove 33 on one side and a radially extending projection 34 on the opposite side. The deformity adds rigidity and strength to the fingers.

The coil strip 24 has a polygonal shape, as shown particularly in FIg. 2, and may have a pair of substantially spaced V-shaped projections 36 extending from a side 38 to bear against the mating side 40 of a finger 30. The projections 36 are only in the area of the coil strip 24 adjacent the fingers 30 of the center shield 16 and will insure a tight interference fit between the coil strips and fingers. There will be no rocking or other movement between the coil strip and its support and the strip will be rigidly held within the tuner structure, thus avoiding any electrical reset problems caused by movement of the coil strip relative to the tightly-held adjusting screw. Basically, the projections 36 insure that there will be a tight interference fit between the fingers and the coil strip and permit a larger tolerance in the design and manufacture of the coil strip and fingers. If the mechanical interference is excessive, when the coil strip is assembled into the center shield, a portion of the ribs or projections will be shaved off as the ribs or projections are relatively small in size. On the other hand, the projections will always insure that there is a tight fit between the elements.

As illustrated in FIGS. 4 and 5, the coil strip retaining disc 14 may have a plurality of outwardly-extending fingers 42 with the coil strip again being supported between adjacent fingers. Each of the fingers 42 include spaced arms 44, there being a small gap 46 between adjacent arms to provide some circumferential flexibility. Adjacent the periphery of each of the arms 44 are projections 48 which extend in an axial direction. The projections 48 on the coil strip retaining disc 14 extend toward and bear against the screw retaining disc 12.

In like manner, the screw retaining disc 12 may have outwardly extending fingers 50 which support oscillator adjustment screws 28. Adjacent the periphery of the fingers 50, there may similarly be axially extending projections 52 which extend toward the oscillator strip retaining disc 14. Thus, the discs 12 and 14 are fixed on the shaft 10 at their axis and are held against relative rotation or other forms of relative movement by the projections 48 and 52. The projections 48 and 52 extend toward each other or extend from one disc toward the opposite disc, thereby insuring a sufficiently rigid fit between the two discs that there will be no relative movement between them. In effect, the projections each provide a peripheral bias in an axial direction to firmly hold the discs in position.

Although as shown in the drawings and described herein, there are projections on both the arms or fingers of the strip retaining disc 14 and the screw retaining disc 12, it may only be necessary to have projections on one of these discs. In this connection, the projections could be on either one or the other of the discs, as what is important is to provide a peripheral axial bias or an interference between the discs in such a manner that there is no relative movement between them.

In the case of the projections 36 which insure an interference fit between the center shield and the coil strips and in the case of the projections which insure that the discs 12 and 14 will not move relative to each other, the basic purpose is to retain the oscillator adjustment screw in a particular adjusted position and thus to prevent any undesirable movement of the screw once a particular channel has been tuned. Movement of the coil strip may effect electrical reset due to a change in electrical path between the printed circuit board contacts and coil strip contacts plus undesirable oscillator screw movement.

Whereas the preferred form of the invention has been shown and described herein, it should be realized that there may be many modifications, substitutions and alterations thereto.

The embodiments of the invention which an exclusive property or privilege is claimed are defined as follows:

1. In a TV tuner, a rotating channel selector shaft, a plurality of longitudinally extending oscillator coil means, support means fixed to said shaft for mounting said oscillator coil means for rotation with said shaft, said support means including radially outwardly-extending fingers, with each of said oscillator coil means being positioned between and generally perpendicular to adjacent fingers, each of said oscillator coil means having a plurality of substantially spaced projections extending outwardly in a generally circumferential direction and bearing against only one of said fingers at spaced locations thereon for providing an interference fit preventing relative movement between said coil means and support.

2. The structure of claim 1 further characterized in that said projections are generally V-shaped.

3. The structure of claim 1 further characterized in that said support means includes a screw retaining disc and an oscillator coil means retaining disc mounted adjacently on said shaft, and means adjacent the periphery of said discs preventing relative movement therebetween.

4. In a TV tuner, rotating channel selector shaft, a plurality of longitudinally extending oscillator coil means, an oscillator tuning screw for each of said coil means extending outwardly therefrom, support means fixed to said shaft for mounting said oscillator coil means and screws for rotation with said shaft, said support means including a screw retaining disc and an oscillator coil means retaining disc mounted adjacently on said shaft, said coil means retaining disc and screw retaining disc each including a plurality of radially extending fingers, and means fixed to the periphery of one of said discs for preventing relative movement therebetween, including projections extending outwardly from one of said discs and bearing against the other, said projections being mounted adjacent the periphery of the fingers of one of said discs and bearing against the other disc.

5. The structure of claim 4 further characterized in that said projections extend in a direction parallel to the axis of said shaft.

6. The structure of claim 4 further characterized in that said projections extend outwardly from said coil means retaining disc and bear against said screw retaining disc.

7. The structure of claim 4 further characterized in that said projections extend outwardly from said screw retaining disc and bear against said strip retaining disc.

* * * * *